United States Patent
Heckmann et al.

(10) Patent No.: US 8,240,781 B2
(45) Date of Patent: Aug. 14, 2012

(54) METHOD FOR OPERATING A BRAKE SYSTEM FOR MOTOR VEHICLES

(75) Inventors: Hans Heckmann, Karlsruhe (DE); Jens Kolarsky, Bietigheim/Bissingen (DE); Harald Hermann, Friolzheim (DE); Timo Jahnz, Besigheim (DE); Dirk Foerch, Neuenstadt/Stein (DE); Werner Quirant, Beilstein (DE); Michael Kunz, Gerlingen (DE); Michael Bunk, Heilbronn (DE); Philipp Grell, Bietigheim-Bissingen (DE); Thomas Loeffler, Obersulm (DE)

(73) Assignee: Robert Bosch GmbH, Stuttgart (DE)

( * ) Notice: Subject to any disclaimer, the term of this patent is extended or adjusted under 35 U.S.C. 154(b) by 1058 days.

(21) Appl. No.: 12/088,618

(22) PCT Filed: Sep. 15, 2006

(86) PCT No.: PCT/EP2006/066390
§ 371 (c)(1),
(2), (4) Date: Jun. 27, 2008

(87) PCT Pub. No.: WO2007/036438
PCT Pub. Date: Apr. 5, 2007

(65) Prior Publication Data
US 2009/0051215 A1   Feb. 26, 2009

(30) Foreign Application Priority Data

Sep. 29, 2005 (DE) .......................... 10 2005 046 652

(51) Int. Cl.
*B60T 8/32* (2006.01)
(52) U.S. Cl. .................. 303/191; 303/15; 303/119.1
(58) Field of Classification Search .................. 303/15, 303/119.1, 191
See application file for complete search history.

(56) References Cited

U.S. PATENT DOCUMENTS

| 3,253,409 | A  | * | 5/1966  | Kellogg et al. ................. 60/329 |
| 5,971,503 | A  |   | 10/1999 | Joyce et al. |
| 6,145,939 | A  | * | 11/2000 | Chang et al. ...................... 303/3 |
| 6,203,123 | B1 | * | 3/2001  | Oyama .......................... 303/191 |
| 6,318,818 | B1 | * | 11/2001 | Brachert et al. ........... 303/119.2 |
| 6,416,141 | B1 | * | 7/2002  | Zinnkann et al. ............. 303/191 |
| 6,428,121 | B1 | * | 8/2002  | Dinkel et al. ................. 303/191 |
| 6,446,490 | B1 | * | 9/2002  | Lohner et al. .................... 73/39 |

FOREIGN PATENT DOCUMENTS

| DE | 19651154 A1 | * | 6/1997 |
| DE | 100 59 348 A1 |   | 6/2001 |
| DE | 101 63 524 A1 |   | 9/2002 |
| JP | 2001163212 A | * | 6/2001 |
| JP | 2004522640 A |   | 7/2004 |
| JP | 2005188605 A |   | 7/2005 |

\* cited by examiner

*Primary Examiner* — Robert A Siconolfi
*Assistant Examiner* — Mariano Sy
(74) *Attorney, Agent, or Firm* — Ronald E. Greigg

(57) ABSTRACT

The invention relates to a method for operating a braking system for motor vehicles with electrically actuated hydraulic valves, the coils of which are powered up, at least in phases, with currents which modify the currentless state of the hydraulic valves, in order to heat the hydraulic fluid present in the system. The hydraulic fluid is heated via a heating profile which, in accordance with the hydraulic fluid temperature, activates the heating phase of the hydraulic fluid. The heating profile consists of a first heating phase and, subsequent thereto, a second heating phase. During the first heating phase, the coils are powered up in such a way that the coil temperature at the end of the first heating phase corresponds to a pre-defined temperature value of the coil which is at least approximately maintained during the second heating phase when powering up the coils.

36 Claims, 2 Drawing Sheets

METHOD FOR OPERATING A BRAKE SYSTEM FOR MOTOR VEHICLES

CROSS-REFERENCE TO RELATED APPLICATION

This application is a 35 USC 371 application of PCT/EP2006/066390 filed on Sep. 15, 2006.

BACKGROUND OF THE INVENTION

1. Field of the Invention

The invention relates to a method for operating a brake system of the type having electrically triggerable hydraulic valves and particularly suited for use in motor vehicles.

2. Description of the Prior Art

Brake systems known in the industry, besides comfort-oriented functions, also have safety-relevant operating strategies, which are made available in so-called ABS systems or ESP units. Particularly in braking interventions on the part of the brake system that stabilize a vehicle, fast reaction times are necessary once a safety-critical driving situation is detected, and such times are a function of the particular pressure buildup dynamics of a brake system.

At very low ambient temperatures of a vehicle, because of increased viscosity of the brake fluid of a brake system, the pressure buildup dynamics of a brake system is impaired so severely that sufficiently fast reaction times of a brake system can be attained only with difficulty, since high pressure losses occur as a result of the increased viscosity.

From U.S. Pat. No. 5,971,503, a hydraulic control system with a hydraulic pump and with a device that is actuatable as a function of a hydraulic pressure is known. The control system includes hydraulic lines, hydraulic valves, and an electronic control circuit for supplying current to the hydraulic valves, in order, by supplying current in the region of the hydraulic valves, to warm a hydraulic fluid located in the brake system if this fluid has a viscosity that impairs the pressure buildup dynamics.

However, it is disadvantageous that the hydraulic valves are supplied with current in such a way that during a warming phase of the hydraulic fluid of the brake system, they remain in a mode of operation that is equivalent to a currentless switching state, and the warming of the hydraulic fluid is accomplished with only a slight heating output, so that the pressure buildup dynamics of the brake system is not improved until after an undesirably long period of time.

In the method known from German Patent Disclosure DE 101 63 524 A1 for triggering a braking system for motor vehicles with electrically triggerable hydraulic valves and a hydraulic pump, one or more existing valve coils, required for hydraulic control functions, are triggered for the sake of electrical heating of one or more holders that hold these coils; the triggering is done for longer lengths of time than necessary for the regulating function and/or in periods of time in which it is unnecessary for the regulating functions, and the triggering is also done with current intensities that are suitable for opening the respective valve when it is closed when without current, or to close it when it is open when without current.

In this method, the hydraulic valves are supplied with higher current intensities than in the method known from U.S. Pat. No. 5,971,503. Thus the hydraulic fluid of the braking system is warmed faster in the direction of a temperature at which the hydraulic fluid has a viscosity that makes improved pressure buildup dynamics of a brake system possible.

It is provided in this reference that the hydraulic fluid of the braking system is first warmed during a first heating phase, which includes a first heating pulse, followed by an interval without heating and at least one further heating pulse; after the first heating phase, at least one temperature measurement is performed, and particularly during the heating phases, no temperature measurement is performed. It is furthermore provided that second or further heating phases are not started until, or are started only whenever, the temperature measured by a temperature sensor is below a predetermined threshold temperature.

However, it is disadvantageous here that direct measurement of the temperature of the hydraulic fluid of the brake system in the region of hydraulic valves of a brake system requires great effort and expense for equipment and therefore entails high costs.

To reduce the costs for the temperature determination of the hydraulic fluid, it is possible for instance, by measurement during operation, to determine a magnitude for warming the hydraulic fluid of the brake system, this magnitude being equivalent to the temperature of the hydraulic fluid in the region of the hydraulic valves that are being supplied with current. For instance, it is possible to use an existing temperature sensor in the brake system that is positioned as close as possible to the hydraulic block of the braking system.

However, this kind of temperature determination is disadvantageously affected by a heat development, occurring during operation of the braking system, in the region of the electric control unit of the braking system. This is due to the fact that because of the temperature sensor already present in the brake system, under some circumstances the temperature increase, which occurs in operation in the region of the control unit and does not cause significant warming of the hydraulic fluid, affects the temperature ascertainment to such an extent that because of incorrect measurement and since the temperature ascertained via the temperature sensor is far from being equivalent to the temperature of the hydraulic fluid, the hydraulic fluid is not warmed as needed to improve the pressure buildup dynamics of the braking system, and the heating of the brake system is ended even though the hydraulic fluid is still, as before, at a temperature that impairs the pressure buildup dynamics of the brake system.

It is therefore the object of the present invention to make a method available for operating a brake system for motor vehicles with electrically triggerable hydraulic valves by means of which method the pressure buildup dynamics of a brake system can be improved in a simple, economical way.

SUMMARY AND ADVANTAGES OF THE INVENTION

In the method according to the invention for operating a brake system for motor vehicles with electrically triggerable hydraulic valves, coils of the hydraulic valves, for warming the hydraulic fluid located in the hydraulic system of the brake system, are supplied at least in some phases with currents that change a currentless switching state of the hydraulic valves; the warming of the hydraulic fluid is started when a hydraulic fluid temperature is less than a threshold value.

According to the invention, the hydraulic fluid is warmed via a heating profile that is a function of a hydraulic fluid temperature that trips a warming phase of the hydraulic fluid, which heating profile comprises a first heating phase and an ensuing second heating phase, and the coils are supplied with current during the first heating phase in such a way that a coil temperature at the end of the first heating phase corresponds to a respective predefined coil temperature value that is at least approximately maintained during the second heating phase by means of supplying current to the coils.

By means of the procedure according to the invention, in which the hydraulic valves change their switching position, the pressure buildup dynamics of a brake system of a motor vehicle is improved within a shorter time, compared to a brake system that is operated in the manner proposed in U.S. Pat. No. 5,971,503.

In addition, with the procedure according to the invention, the pressure buildup dynamics of a brake system are achieved with maximum heating output without adversely affecting or damaging the components, or in other words the end stages of the hydraulic valves that are subjected to thermal energy by the delivery of current to the coils of the hydraulic valves, or without damaging them in such a way as to impair the function of the brake system.

Performing the warming phase of the hydraulic fluid with a heating profile that is a function of the hydraulic fluid temperature that trips the warming phase of the hydraulic fluid, which heating profile has a first heating phase and an ensuing second heating phase, affords the possibility of warming the brake system and thus the hydraulic fluid in the region of the hydraulic valves within a short time during the first heating phase. During the ensuing second heating phase, thermal energy continues to be supplied to the brake system. This is done without interrupting the delivery of current to the coils of the hydraulic valves, at what in comparison to the first heating phase is a lesser heating output, without overloading the components. As a result, the hydraulic fluid is temperature-stabilized as required for improving the pressure buildup dynamics, while sparing the components.

The method of the invention furthermore makes it easily for determining the temperature of the hydraulic fluid in the region of the hydraulic valves, an operation that entails high costs and is made inexact by components that warm up during operation of the brake system, to be dispensed with since the hydraulic fluid is warmed in each case with heating profiles that are a function of the current hydraulic fluid temperature at the onset of the warming phase of the hydraulic fluid, and these heating profiles are preferably ascertained applicatively, without putting excessive loads on temperature-sensitive components of the brake system.

During the first heating phase, the hydraulic valves can preferably be supplied with current at such current values that both the temperature of the components of the brake system and the temperature of the hydraulic fluid have an approximately linear increase. Upon attaining a component temperature that does not damage the components of the brake system, the second heating phase of the warming phase of the hydraulic fluid is started, which is a so-called holding phase and during which the coils of the hydraulic valves are supplied with current at such current intensities that the temperature of the temperature-sensitive components of the system that prevails at the end of the first heating phase is maintained, and the temperature of the hydraulic fluid is rapidly raised to the temperature required for good pressure buildup dynamics of the brake system.

Further advantages and advantageous embodiments of the subject of the invention can be learned from the description, drawings, and claims.

BRIEF DESCRIPTION OF THE DRAWINGS

One variant of the method of the invention is described in further detail herein below, with reference to the drawings, in which.

DESCRIPTION OF THE PREFERRED EMBODIMENT

Figure 1:
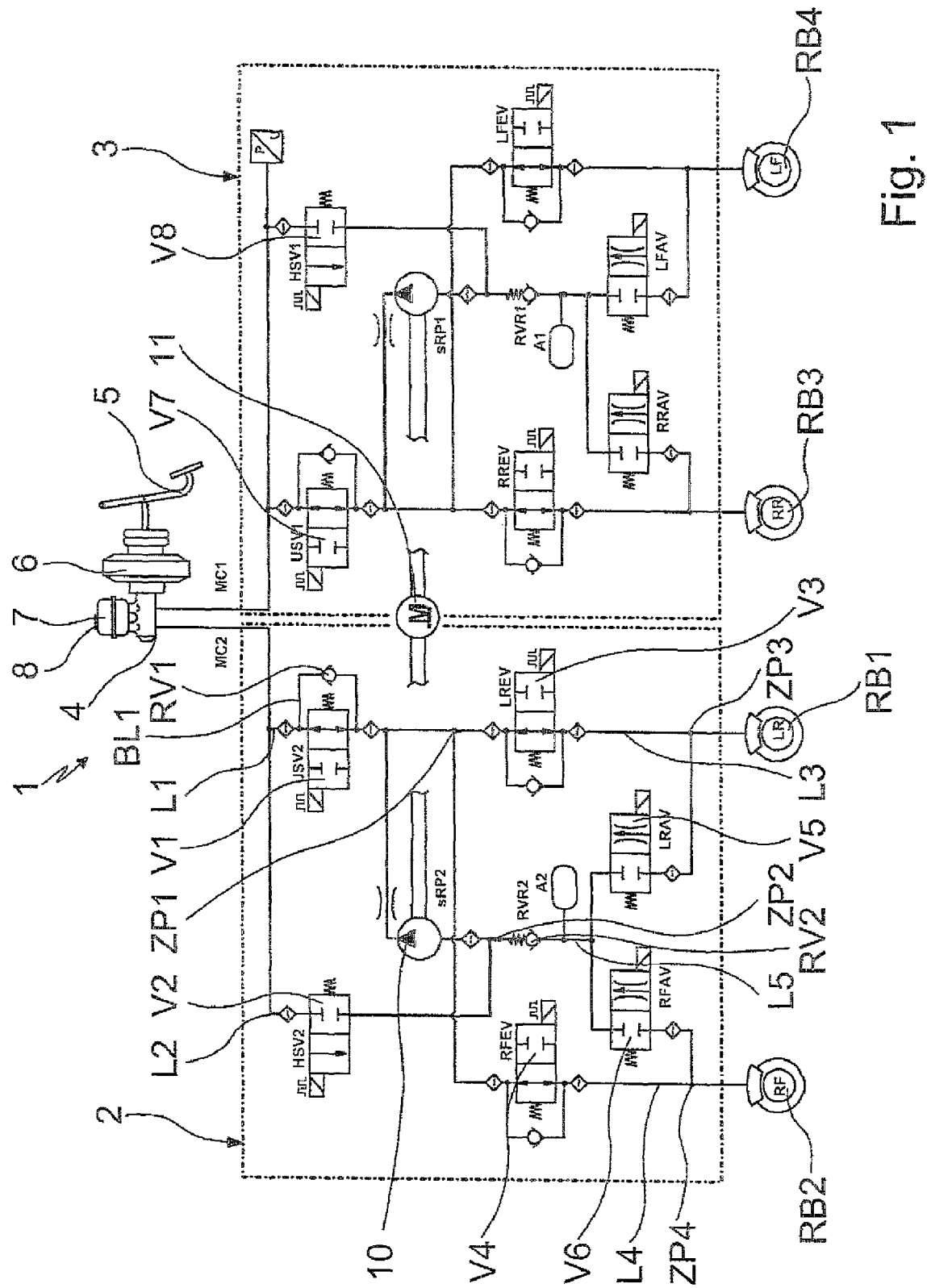
FIG. 1 is a simplified schematic circuit diagram of a brake system that is operated according to the invention.

FIG. 1 shows a circuit diagram of a brake system 1, or brake pressure regulating system, of a vehicle, preferably a TCS or ESP system, which is embodied with hydraulic valves and includes a first pressure circuit 2 and a second pressure circuit 3 that is separate from the first. The pressure circuits 2 and 3 are identical; therefore in explaining the functionalities of the components of the pressure circuits 2 and 3 in the ensuing description, essentially only the first pressure circuit 2 will be referred to in detail below.

The two pressure circuits 2 and 3 here are connected to a master cylinder 4 and, beginning at the master cylinder 4, are subjected, as a function of an actuation of a brake pedal 5 by the driver, to a hydraulic pressure that is boosted in a manner known per se via a brake booster 6. The master cylinder 4 here communicates with a hydraulic fluid container or brake fluid container 7, which in vehicles known in the industry is disposed in the engine compartment and by way of which a fill nozzle 8 can be filled; essentially ambient pressure prevails in the brake fluid container 7.

Downstream of the master cylinder 4, a switchover valve V1 and a high-pressure switching valve V2 are disposed in line branches L1 and L2 that are parallel to one another, so that the volumetric flow of hydraulic fluid originating at the master cylinder 4 can be carried selectively in the first pressure circuit 2 via either the switchover valve V1 or the high pressure switching valve V2 in the direction of wheel brake cylinders RB1 and RB2.

Also downstream of the switchover valve V1, a line branching point ZP1 of the pressure circuit 2 is provided, downstream of which in turn are two wheel inlet valves V3 and V4 embodied as switchover valves. The wheel inlet valves V3 and V4 and the switchover valve V1 are all embodied as valves that are open when without current, and thus in normal operation of the brake system 1, during which the valves V1, V3 and V4 are not subjected to their control currents, the valves V1, V3 and V4 are open, to make braking without delay possible in the event of actuation of the brake pedal 5 by the driver.

In addition, downstream of the high-pressure switching valve V2, a line branching point ZP2 of the pressure circuit 2 is provided, which is in communication with two wheel outlet valves V5 and V6, which are subjected to the control pressures of the wheel brake cylinders RB1 and RB2 in the region of two further branching points ZP3 and ZP4 of supply lines L3 and L4 that extend between the wheel inlet valves V3 and V4 and the wheel brake cylinders RB1 and RB2.

The wheel outlet valves V5 and V6 are embodied as valves that are closed when without current, so that a pressure buildup demanded by the driver in the wheel brake cylinders RB1 and RB2 is reliably assured in normal braking operation of the brake system 1.

Upstream of the switchover valve V1, a bypass line BL1 embodied with a check valve RV1 branches off, so that in the event of a malfunction of the switchover valve V1, in which the hydraulic communication between the master cylinder 4 and the wheel brake cylinders RB1 and RB2 is interrupted by the switchover valve V1, hydraulic fluid continues to be available via the bypass line BL1, and a requested braking event is performed even if the switchover valve V1 has failed.

If it is found via suitable devices that the vehicle wheel triggered by the wheel brake cylinder RB1 or by the wheel brake cylinder RB2 is locking in an unwanted way, then the delivery of pressure to the wheel brake cylinder RB1 or the wheel brake cylinder RB2, in the region of the wheel inlet valve V3 or of the wheel inlet valve V4, is blocked by suitable delivery of current to the electromagnetic actuation unit of the affected valve, and the wheel outlet valve V5 or V6 corresponding to the respective wheel brake cylinder RB1 or RB2 is triggered in such a way that the pressure in the wheel brake cylinder RB1 or in the wheel brake cylinder RB2 is reduced by a required amount, and the locking of the wheel is undone.

When the wheel outlet valves V5 and V6 are open, the hydraulic fluid carried via these two valves is delivered in the direction of an intake side of a positive-displacement element 10, embodied in the present case as a single-piston pump. In a connecting line L5 between the wheel outlet valves V5 and V6 and the positive-displacement element 10, which positive-displacement element acts as a constant pump or a pumping device with a constant positive-displacement volume, a check valve RV2 is disposed, so that only hydraulic fluid from the wheel outlet valves V5 and V6 can be carried in the direction of the positive-displacement element 10.

Moreover, the possibility also exists of blocking the wheel inlet valves V3 and V4 when the wheel outlet valves V5 and V6 are closed, in order to avoid an unwanted or impermissible increase of pressure in the region of the wheel brake cylinders RB and RB2.

Between the second check valve RV2 and the positive-displacement element 10, the line branch L2, which in the currentless state of the high-pressure switching valve V2 is blocked off from that valve, discharges on the intake side of the positive-displacement element 10 into the connecting line L5. Thus the volumetric flow of hydraulic fluid fed from the master cylinder 4 into the first pressure circuit 2 can be delivered given suitable delivery of current to the high-pressure switching valve V2 and with the switchover valve V1 simultaneously closed, between the second check valve RV2 and the positive-displacement element 10, to the intake side of the positive-displacement element 10, and the pressure in the region of the wheel brake cylinders RB1 and RB2 can be varied actively as needed by means of additional sealing work compared to the pressure originating at the brake booster.

This means that the two wheel brake cylinders RB1 and RB2, when the switchover valve V1 is closed, communicate fluidically with the compression side of the positive-displacement element 10 while the wheel inlet valves V3 and V4 are simultaneously open, and in the region of the positive-displacement element 10, in accordance with a rotational drive of an electric motor 11, the hydraulic pressure originating in the master cylinder 4 is raised as requested to a pressure value required for various comfort-oriented functions of the brake system 1.

Figure 2:
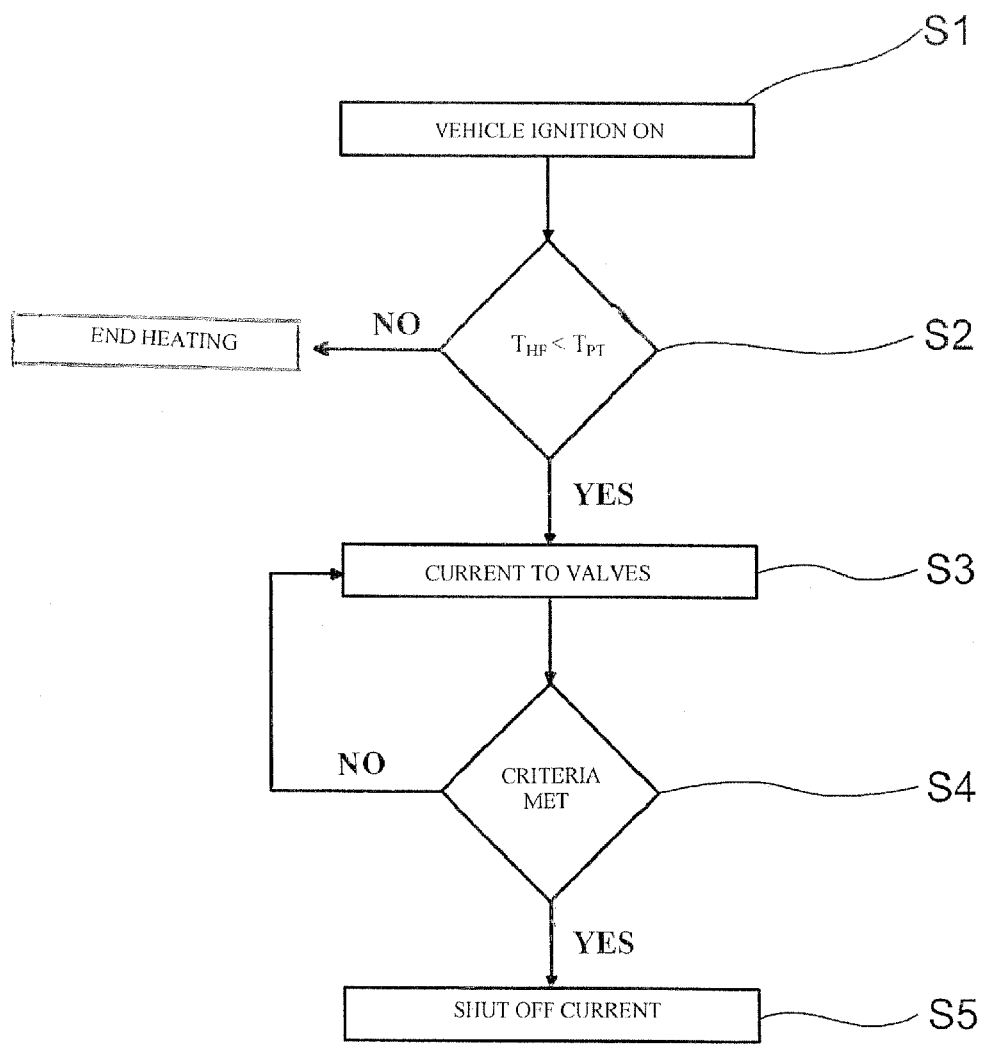
FIG. 2 is a greatly abbreviated flow chart of the method of the invention.

In FIG. 2, a greatly shortened flow chart is shown of a method according to the invention for operating a brake system, preferably the brake system 1 shown in FIG. 1, for motor vehicles that have electrically triggerable hydraulic valves that are embodied with coils.

The method of the invention is first started during a step S1 when a driver of a motor vehicle switches on the vehicle ignition. During an interrogation step S2 following the first step S1, a temperature of the hydraulic fluid located in the brake system 1, or a temperature value equivalent to it, is ascertained and monitored for whether the ascertained temperature value is less than a predefined threshold value of the hydraulic fluid temperature, and if the outcome of the interrogation step S2 is no, the method of the invention is discontinued.

If the outcome of the interrogation step S2 is a jump is made to a third step S3, during which coils of various hydraulic valves of the brake system 1 of FIG. 1 are supplied with current, in the manner described in further detail below, in order to raise the hydraulic fluid temperature such that the viscosity of the hydraulic fluid or brake fluid in the region of a hydraulic unit of the brake system is lowered in a way that improves the pressure buildup dynamics of the brake system 1, and the brake system 1 can be operated in improved fashion with shorter pressure buildup dynamics times.

To that end, in the present instance, a defined set of hydraulic valves of the brake system 1 is supplied with current; this set for instance includes the switchover valve V1, the high-pressure switching valve V2, and the wheel inlet valves V3 and V4 of the first pressure circuit 2, which is associated with the rear axle of the vehicle. In addition, a switchover valve V7 of the second pressure circuit 3 and a high-pressure switching valve V8 of the second pressure circuit 3, which is associated with the front axle of the vehicle, can be supplied with current to warm the hydraulic fluid, so that thermal energy can be delivered to the hydraulic fluid in this region of the brake system 1 as well, without hindering braking in the region of a front axle of the vehicle, since the imposition of pressure to the wheel brake cylinders RB3 and RB4 of the brake system 1 that are associated with the wheels of the front axle of the vehicle is unblocked in a region of the high-pressure switching valve V8, which is being supplied with current, of the second pressure circuit 3. It is understood that it is within the judgment of one skilled in the art, as a function of the particular application involved, to supply current to the hydraulic valves of the second pressure circuit of the brake system, which are intended for acting on the wheel brake cylinders of the front axle of the vehicle, with current values that are less than current values at which the hydraulic valves change their currentless switching state, or in other words switch over.

The supply of current to the hydraulic valves listed above of the brake system 1 is effected by means of a predefined current or voltage profile; the magnitude of the current supply to the hydraulic valves is provided such that the hydraulic valves change their switching position at least in some phases. In other words, hydraulic valves that are closed when without current are opened at least in some phases during the heating of the hydraulic fluid, and hydraulic valves that are open when without current close at least in some phases.

In accordance with the concept of the invention, supplying the hydraulic valves of the brake system 1 with currents that change a currentless switching state of the hydraulic valves advantageously quickly leads to coil temperatures of the hydraulic valves that bring about an approximately linear increase in the temperature of the hydraulic fluid.

The supply of current to the hydraulic valves during the course of the method is furthermore predetermined in such a way that at a defined ambient temperature of the brake system, a predefined maximum coil temperature of the coils of the hydraulic valves to which current is supplied is not exceeded. It is thus assured that overly high temperatures do not occur in the region of the valve end stages of the hydraulic valves; damage to the temperature-sensitive components of the brake system 1 is avoided; and all the functionalities of the brake system 1 continue to be available to their full extent, despite the warming.

It is provided that the hydraulic fluid of the brake system 1 is warmed, via a heating profile that is a function of a hydraulic fluid temperature that trips a warming phase of the hydraulic fluid during the interrogation step S2; this heating profile comprises a first heating phase and an ensuing second heating phase, and the coils of the hydraulic valves, to which current is to be supplied, of the brake system 1 are supplied with current during the first heating phase in such a way that a coil temperature, at the end of the first heating phase, corresponds to a respective predefined coil temperature value, which is at least approximately maintained during the second heating phase by means of supplying the coils with less current than during the first heating phase. The coil temperature value is constant for all the heating profiles but in a deviation from this it can vary as a function of an ambient temperature of the brake system 1.

This means that the hydraulic valves are supplied with higher currents during the first heating phase or the high-current phase, and then during the ensuing second heating phase are supplied with lower currents, so that the hydraulic valves are supplied with current essentially permanently during the entire warming phase of the hydraulic fluid, until for instance a maximum warming time is reached, after which the hydraulic fluid has a temperature and viscosity that improve the pressure buildup dynamics of the brake system 1.

The heating times of the first heating phase and of the second heating phase aid the magnitude of the current intensities supplied to the coils are determined applicatively and are preferably selected as a function of the hydraulic fluid temperature prevailing at the start of the method of the invention, or as a function of the temperature value of the brake system equivalent to that temperature, from a performance graph stored in memory in the control unit of the brake system 1. In other words, in the region of its hydraulic unit, the brake system 1 is heated with a heating profile with heating outputs that reliably prevent damage to components of the brake system 1

In order to be able to warm the hydraulic fluid with maximum heating output in each case, the current intensities supplied to the coils vary both during the first heating phase or high-current phase and during the second heating phase or holding phase; in a further variant of the method of the invention, it may also be provided that the current intensities during the first heating phase and/or during the second heating phase are kept at least approximately constant.

Finally, the heating profiles are also defined in such a way that functionalities known per se of the brake system 1 are unimpaired by the heating of the hydraulic valves, since the components of the brake system 1 that are subjected to thermal energy by the warming of the hydraulic fluid are kept below the temperatures required for assuring the function of the brake system 1.

The third step S3 is followed by an interrogation step S4, during which a check is made as to whether one or more discontinuation criteria for terminating the warming phase of the hydraulic fluid are present. If the outcome of the interrogation step S4 is negative, a jump is made back to step S3, and the valves continue to be supplied with current.

If the outcome of the interrogation step S4 is positive, the warming phase of the hydraulic fluid is discontinued by shutoff of the supply of current to the valves of the brake system 1 during a step S5.

During the interrogation step S4, it is also checked, among other things, whether a predefined maximum heating time has been exceeded.

Criteria that lead to discontinuing the warming phase of the hydraulic fluid are the recognition of so-called undervoltage of an on-board electrical system, the ascertainment of an implausible hydraulic pressure in the pressure circuits 2 and 3 of the brake system 1, and the presence of an implausible deceleration of the vehicle, the ascertainment of an implausible hydraulic pressure in the pressure circuits 2 and 3 of the brake system 1, and the presence of an implausible deceleration of the vehicle.

For instance during vehicle operation, a supply voltage of an on-board electrical system of the vehicle is ascertained at terminals of the control unit of the brake system, and if a predefined threshold value is undershot, the supply of current to the hydraulic valves is interrupted, so as not to threaten or impair the electrical supply to other consumers from the on-board electrical system.

The pressure in the brake system 1 during the warming of the hydraulic fluid is monitored, among other reasons, because the hydraulic valves supplied with current for warming the hydraulic fluid are switched over from their current less switching state, and between the then-closed wheel inlet valves V3 and V4 and the wheel brake cylinders RB1 and RB2, pressure values can build up that cause brake linings to be applied to brake drums or disks of the brake system 1 and that may cause resultant braking, which however is not wanted.

In general, the method of the invention is interrupted in any arbitrary process step when a driver demand for braking or fully active intervention into the brake system 1 occurs. It is thus assured that the functionality, known per se, of the brake system 1 is not impaired by the procedure according to the invention. Braking demanded by the driver is ascertained here, in a manner not shown in detail, preferably as a function of a pressure signal of a pressure sensor of the master cylinder 4 of the brake system 1 or of a status of a sensor device associated with the brake pedal 5 or a brake light switch.

The above-described method of the invention can be used in a simple way to improve the pressure buildup dynamics at unfavorable operating temperatures of the hydraulic fluid in all brake systems, in particular in conventional feedback hydraulics, such as ESP units, and can be implemented in existing brake systems at only expense.

The foregoing relates to the preferred exemplary embodiment of the invention, it being understood that other variants and embodiments thereof are possible within the spirit and scope of the invention, the latter being defined by the appended claims.

The invention claimed is:

1. A method for operating a brake system for motor vehicles, the system having electrically triggerable hydraulic valves equipped with coils, of which at least one coil, for warming the hydraulic fluid located in the brake system, is supplied at least in some phases with a current that varies a currentless switching state of the hydraulic valve, and the warming of the hydraulic fluid is started by a supply of current to the coil in a presence of a hydraulic fluid temperature that is less than a threshold value, the method comprising warming the hydraulic fluid via a heating profile that is a function of a hydraulic fluid temperature that trips a warming phase of the hydraulic fluid, the heating profile including a first heating phase and an ensuing second heating phase, and supplying at least one coil with current during the first heating phase in such a way that a coil temperature at an end of the first heating phase corresponds to a respective predefined coil temperature value that is at least approximately maintained during the second heating phase by means of supplying current to the coil and discontinuing the warming phase of the hydraulic fluid upon detection of a pressure in the brake system that is implausible for a current mode of operation of the brake system.

2. The method as defined by claim 1, wherein the coil temperature value is a function of an ambient temperature of the brake system.

3. The method as defined by claim 2, further comprising varying current values with which the coils are supplied during the first heating phase and/or during the second heating phase.

4. The method as defined by claim 3, further comprising discontinuing the warming phase of the hydraulic fluid upon undershooting of a threshold value of a supply voltage of an on-board electrical system of the motor vehicle.

5. The method as defined by claim 3, further comprising interrupting the method upon detection of braking that is requested by the driver and/or the brake system.

6. The method as defined by claim 5, further comprising ascertaining driver-requested braking as a function of a signal of a sensor device.

7. The method as defined by claim 3, further comprising switching off a supply of current to the hydraulic valves upon termination of the warming phase of the hydraulic fluid.

8. The method as defined by claim 1, further comprising varying current values with which the coils are supplied during the first heating phase and/or during the second heating phase.

9. The method as defined by claim 8, further comprising discontinuing the warming phase of the hydraulic fluid upon detection of a pressure in the brake system that is implausible for a current mode of operation of the brake system.

10. The method as defined by claim 1, further comprising terminating the warming phase once a maximum heating time has elapsed.

11. The method as defined by claim 10, further comprising interrupting the method upon detection of braking that is requested by the driver and/or the brake system.

12. The method as defined by claim 11, further comprising ascertaining driver-requested braking as a function of a signal of a sensor device.

13. The method as defined by claim 2, further comprising interrupting the method upon detection of braking that is requested by the driver and/or the brake system.

14. The method as defined by claim 8, further comprising interrupting the method upon detection of braking that is requested by the driver and/or the brake system.

15. The method as defined by claim 1, further comprising interrupting the method upon detection of braking that is requested by the driver and/or the brake system.

16. The method as defined by claim 15, further comprising ascertaining driver-requested braking as a function of a signal of a sensor device.

17. The method as defined by claim 1, further comprising switching off a supply of current to the hydraulic valves upon termination of the warming phase of the hydraulic fluid.

18. The method as defined by claim 1, wherein the brake system has two pressure circuits which are embodied with hydraulic valves, and for warming the hydraulic fluid, at least one hydraulic valve of the pressure circuits is supplied with current.

19. A method for operating a brake system for motor vehicles, the system having electrically triggerable hydraulic valves equipped with coils, of which at least one coil, for warming the hydraulic fluid located in the brake system, is supplied at least in some phases with a current that varies a currentless switching state of the hydraulic valve, and the warming of the hydraulic fluid is started by a supply of current to the coil in a presence of a hydraulic fluid temperature that is less than a threshold value, the method comprising warming the hydraulic fluid via a heating profile that is a function of a hydraulic fluid temperature that trips a warming phase of the hydraulic fluid, the heating profile including a first heating phase and an ensuing second heating phase, and supplying at least one coil with current during the first heating phase in such a way that a coil temperature at an end of the first heating phase corresponds to a respective predefined coil temperature value that is least approximately maintained during the second heating phase by means of supplying current to the coil and wherein discontinuing the warming phase of the hydraulic fluid upon undershooting of a threshold value of a supply voltage of an on-hoard electrical system of the motor vehicle.

20. The method as defined by claim 19, wherein the coil temperature value is a function of an ambient temperature of the brake system.

21. The method as defined by claim 20, further comprising varying current values with which the coils are supplied during the first heating phase and/or during the second heating phase.

22. The method as defined by claim 21, further comprising discontinuing the warming phase of the hydraulic fluid upon undershooting of a threshold value of a supply voltage of an on-board electrical system of the motor vehicle.

23. The method as defined by claim 21, further comprising interrupting the method upon detection of braking that is requested by the driver and/or the brake system.

24. The method as defined by claim 23, further comprising ascertaining driver-requested braking as a function of a signal of a sensor device.

25. The method as defined by claim 21, further comprising switching off a supply of current to the hydraulic valves upon termination of the warming phase of the hydraulic fluid.

26. The method as defined by claim 19, further comprising varying current values with which the coils are supplied during the first heating phase and/or during the second heating phase.

27. The method as defined by claim 26, further comprising discontinuing the warming phase of the hydraulic fluid upon detection of a pressure in the brake system that is implausible for a current mode of operation of the brake system.

28. The method as defined by claim 19, further comprising terminating the warming phase once a maximum heating time has elapsed.

29. The method as defined by claim 28, further comprising interrupting the method upon detection of braking that is requested by the driver and/or the brake system.

30. The method as defined by claim 29, further comprising ascertaining driver-requested braking as a function of a signal of a sensor device.

31. The method as defined by claim 19, further comprising interrupting the method upon detection of braking that is requested by the driver and/or the brake system.

32. The method as defined by claim 31, further comprising ascertaining driver-requested braking as a function of a signal of a sensor device.

33. The method as defined by claim 20, further comprising interrupting the method upon detection of braking that is requested by the driver and/or the brake system.

34. The method as defined by claim 26, further comprising interrupting the method upon detection of braking that is requested by the driver and/or the brake system.

35. The method as defined by claim 19, further comprising switching off a supply of current to the hydraulic, valves upon termination of the warming phase of the hydraulic fluid.

36. The method as defined by claim 19, wherein the brake system has two pressure circuits which are embodied with hydraulic valves, and for warming the hydraulic fluid, at least one hydraulic valve of the pressure circuits is supplied with current.

* * * * *